APPARATUS FOR AERATING STORED GRAIN

Original Filed Sept. 29, 1969 3 Sheets-Sheet 1

INVENTOR
EUGENE G. SUKUP
BY
Henderson & Sturm
ATTORNEYS

APPARATUS FOR AERATING STORED GRAIN

Original Filed Sept. 29, 1969 3 Sheets-Sheet 2

INVENTOR
EUGENE G. SUKUP
BY
Henderson & Sturm
ATTORNEYS

APPARATUS FOR AERATING STORED GRAIN

Original Filed Sept. 29, 1969 3 Sheets-Sheet 3

INVENTOR
EUGENE G. SUKUP
BY
Henderson & Sturm
ATTORNEYS

United States Patent Office

Re. 27,931
Reissued Feb. 26, 1974

27,931

APPARATUS FOR AERATING STORED GRAIN

Eugene G. Sukup, Dougherty, Iowa 50433

Original No. 3,584,842, dated June 15, 1971, Ser. No. 861,685, Sept. 29, 1969. Application for reissue June 14, 1972, Ser. No. 262,835
Int. Cl. B01f *7/00*
U.S. Cl. 259—102 16 Claims

Matter enclosed in heavy brackets [ ] appears in the original patent but forms no part of this reissue specification; matter printed in italics indicates the additions made by reissue.

ABSTRACT OF THE DISCLOSURE

An apparatus for aerating grain stored in an enclosure by mechanically moving a stirring apparatus therethrough. The apparatus comprises a vertically disposed element which is rotatably mounted on a carriage movable itself back and forth on a flightless, smooth tubular member which is rotated about its own axis as it is moved over the stored grain. The tubular member is supported above the grain by means connected to the enclosure and a motor is provided for both rotating and moving the tubular member.

BACKGROUND OF THE INVENTION

It has been found that to stir or agitate grain stored in a bin or the like shortens the drying time requirements and prevents the formation of crusts or hot spots on top of and within particularly the upper layers of the grain. It is now generally accepted that mechanical grain-stirring devices eliminate overdrying, cut drying costs, and increase drying capacities of conventional grain bins.

Applicant's issued U.S. Pat. No. 3,272,480 best illustrates the type of apparatus with which this invention is concerned, and shows that one former requirement was the reversing of direction of an augerlike conveyor, which required a reversible motor and the switching therefor, and which required further a continual stopping of the rotation of the conveyor in one direction, and a starting of the rotation in the opposite direction. It is to obviate this requirement, among other advantages, which is the purpose of this invention.

SUMMARY OF THE INVENTION

This invention relates to a grain-moving apparatus for operation within an enclosure, a grain storage bin, for example. The apparatus comprises a vertically disposed auger of sufficient length to extend substantially the entire height of the bin above a bottom floor so that the auger extends throughout all grain therein. The upper end of the stirring auger is connected to a frame which carries a motor for rotating the auger by remote control.

The fame is mounted by antifriction balls on an elongated, smooth-surfaced tube which is movably supported on the enclosure above whatever grain is placed within the bin. Means such as a motor also remotely controlled are provided for rotating the tube about its longitudinal axis, and for moving the tube simultaneously or independently of such rotation over the grain.

Also mounted on the frame and in contact with the tube is a friction unit, opposite end portions of which are alternately engageable with a pair of control devices, such as a pair of plates each having a diameter larger that of the tube, and which are secured in axially spaced relation to the tube. The unit, as determined by which end portion thereof is engaged and moved by a plate, assumes one of two alternate positions on the tube, whereupon rotation of the tube in one constant direction of rotation effects axial movement of the frame repeatedly back and forth between the plates.

The principal object of this invention is the provision of an improved grain-aerating apparatus.

Another object of this invention is to provide a grain-stirring apparatus utilizing a horizontally disposed, axially rotatably tubular member as the conveyor for a stirring auger-carrying frame, wherein the tubular member need only rotate in one direction.

Still another object of this invention is an apparatus as defined hereinbefore wherein the tubular member has a smooth outer surface with a constant outer diameter substantially the entire length thereof.

Yet another object of this invention is to provide an apparatus capable of attaining these objectives which is economical, easily manufactured and effective in operation.

DESCRIPTION OF THE PREFERRED EMBODIMENT

Figure 1:
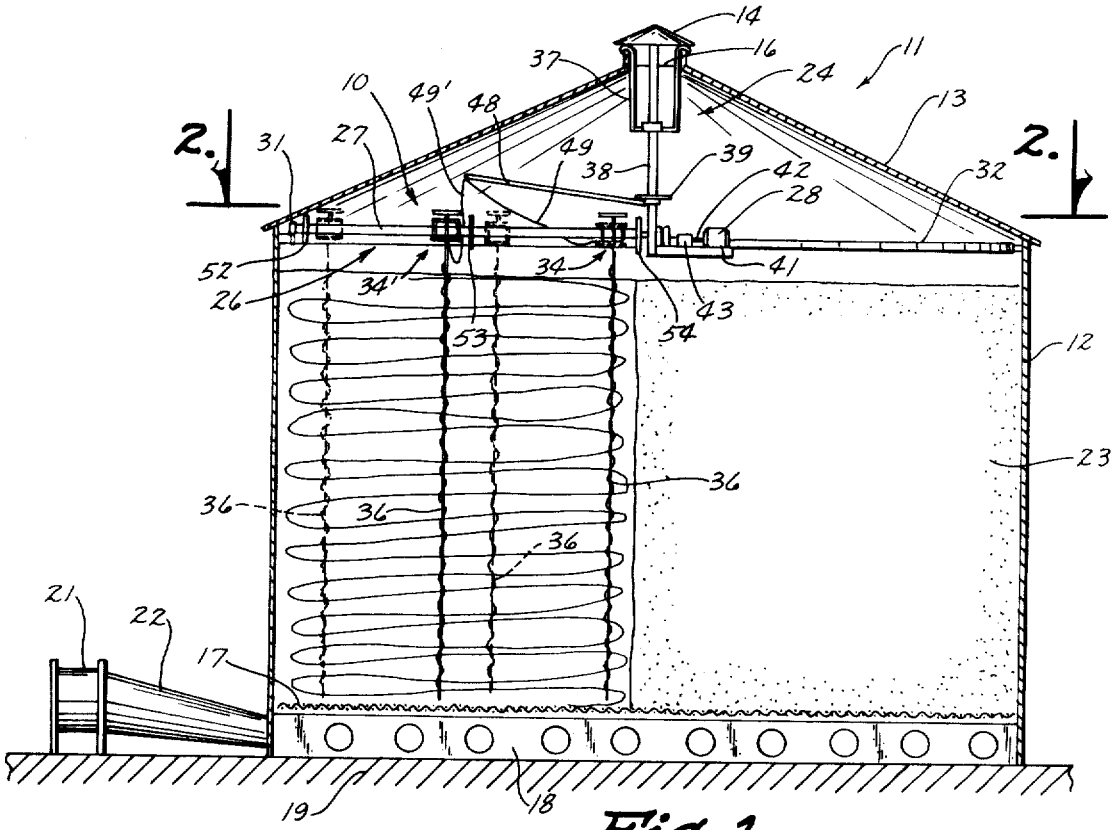
FIG. 1 is a sectional view of a conventional grain bin, showing the apparatus of this invention mounted therein.
Figure 2:
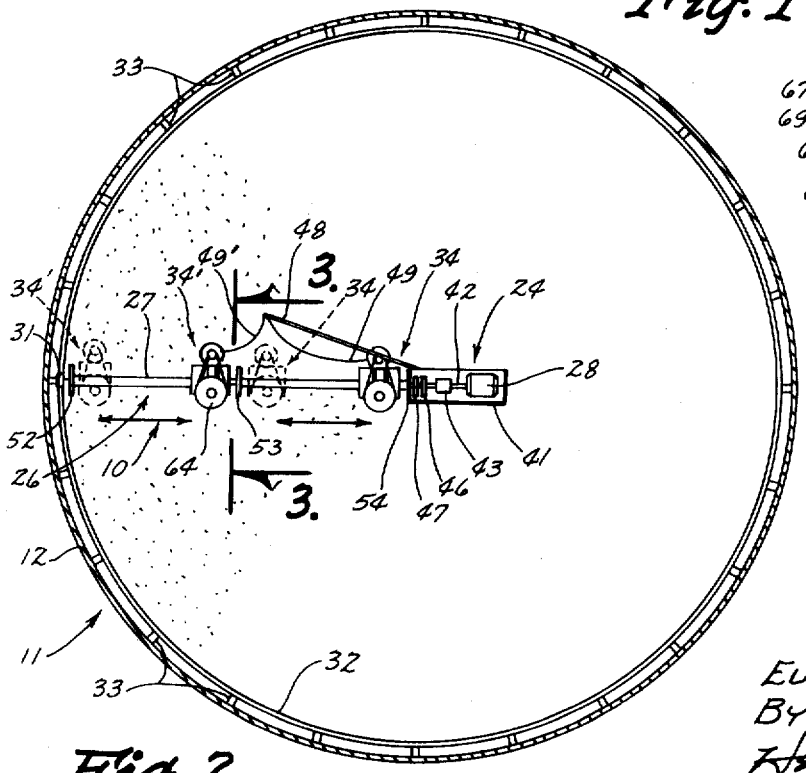
FIG. 2 is a plan view of the apparatus of FIG. 1 taken along the line 2—2 in FIG. 1.
Figure 3:
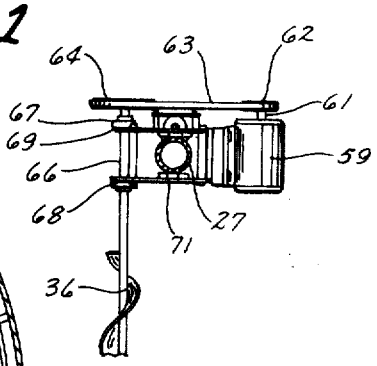
FIG. 3 is an enlarged, partial side elevational view taken along line 3—3 in FIG. 2.

Referring to the drawings, the grain-moving apparatus of this invention is depicted generally at 10 in FIGS. 1 and 2, and is adapted for use inside a commercially available grain bin 11. The bin 11 comprises a circular sidewall 12 of galvanized steel having an umbrella-type roof 13 supported thereon, which roof is provided with a ventilator cover 14. The ventilator may be adjustable to regulate the airflow therethrough, as is conventionally provided.

An opening 16 of a circular design is formed in the upper portion of the roof 13, with a series of arcuate pockets (not shown) formed about the opening 16 by the metal joints of the roof panels. At the bottom of the grain bin 11, a circular perforated drying floor 17 is provided which is mounted on a steel understructure which includes a plurality of floor channels 18 (FIG. 1). The grain bin 11 as a whole is mounted on a concrete foundation 19.

For supplying fresh air internally of the bin 11 for passage through the grain therein, a fan 21 (FIG. 1) is mounted on a portion of the foundation 19, and upon operation, forces air through a transition unit 22 so that the air passes beneath the perforated floor 17 and then upwardly through the grain 23 which has been transferred into bin 11.

Generally, the apparatus 10 comprises a support unit 24 (FIG. 1) attached to the roof 13; a conveyor unit 26 mounted on the support unit 24 and rotatable in a circular direction thereabout, the unit 26 including a horizontally disposed shaft 27 and a motor 28 therefor; a wheel 31 attached to the outer end of the shaft 27; a circular track 32 for receiving the wheel 31 and which is mounted on a plurality of brackets 33 (FIG. 2) secured about the wall 12; a frame unit, of which a pair 34 and 34' (FIGS. 1 and 2) are shown, which units 34 and 34' are rotatably mounted on the shaft 27 so as to be movable longitudinally thereof; and a vertically disposed auger 36 operably connected to each frame unit 34 and 34' and depending into the grain 23 for tumbling same upon rotation of the auger 36, and for moving the grain upwardly relative to an auger 36 due to the flighting thereof.

More specifically, the support unit 24 comprises a plurality of strap fasteners 37 (FIG. 1) the upper ends of which hook over the open upper edge of the cover 14. A bracket 38 depends centrally from the fasteners 37 and has a bushing device 39 at its lower end. The underside of the device 39 rotates horizontally 360° about the upper side thereof, and from the underside of which an L-shaped structure 41 depends.

Mounted on the upper horizontal side of the structure 41 is the motor 28 (FIG. 2), the power shaft 42 of which extends into a gearbox 43. The inner end 44 of the shaft 27 extends through a pair of bearing blocks 46 and 47 mounted on the structure 41 and into the gearbox 43. Electric power is provided to the motor 28 and to a swivel switch mounted below the device 39. A rotatable boom 48 suspends a pair of electric cables 49 and 49' to the respective frame units 34 and 34' for supplying electricity thereto at all times during operation of the apparatus 10, and provides a means for electrically connecting the frame units 34 and 34' to the motor 28 for a reason described hereinafter.

The conveyor unit 26 comprises the shaft 27, a trio of plates 52, 53 and 54 which are mounted in a predetermined spaced relation on the shaft 27. Each plate is provided with a plurality of beads 56 (FIGS. 4 and 5) which face, on an appropriate side of the plate, a frame unit 34 or 34'. For properly operating each frame unit, a pair of plates are provided, and it is readily appreciated that but one additional plate is needed for the addition of a frame unit. As will be described more in detail hereinafter, the travel of a frame unit 34 and 34' longitudinally of the shaft 27 is entirely dependent upon the longitudinal spacing of the plates 52, 53 and 54.

The shaft 27 itself, as best depicted in FIGS. 1, 4, 7, and 8, is of tubular nature, having a smooth outer surface 51 with a constant outer diameter substantially the entire length thereof.

Figure 4:
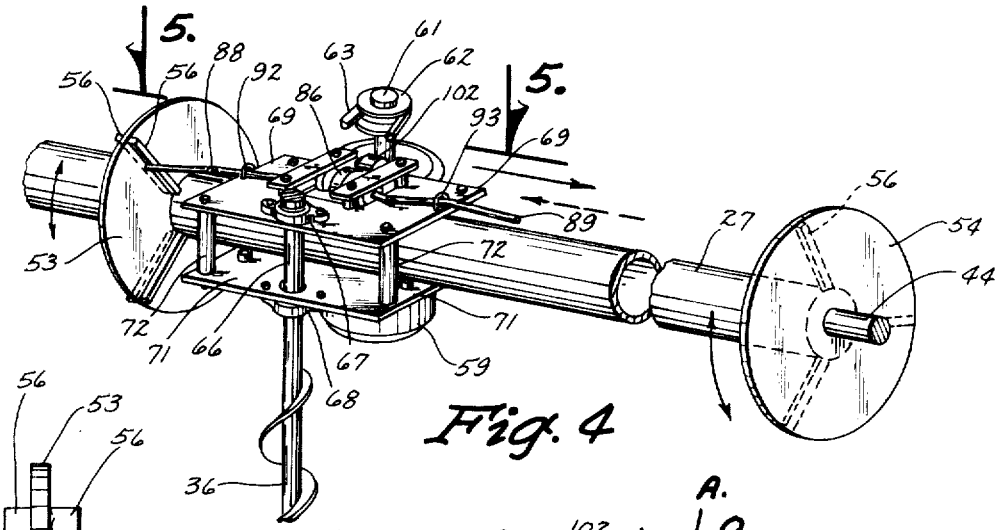
FIG. 4 is an enlarged, foreshortened, perspective view of a portion of the apparatus of the invention.

As each frame unit 34 and 34' is identical, only one will be described with like reference numerals indicating like elements. Referring primarily to FIGS. 4–10 inclusive, the frame unit 34 includes a frame 57 and a friction drive unit 58, plus a motor 59 (FIGS. 4 and 6). The motor 59 provdes drive through its output shaft 61 and a pulley 62 for a belt 63 and a pulley 64 to transmit said drive to the upper end 66 of the auger 36, which upper end 66 is rotatably inserted through bearing blocks 67 and 68 secured to the top piece 69 and bottom piece, respectively, 71 of the frame 57.

Figure 9:
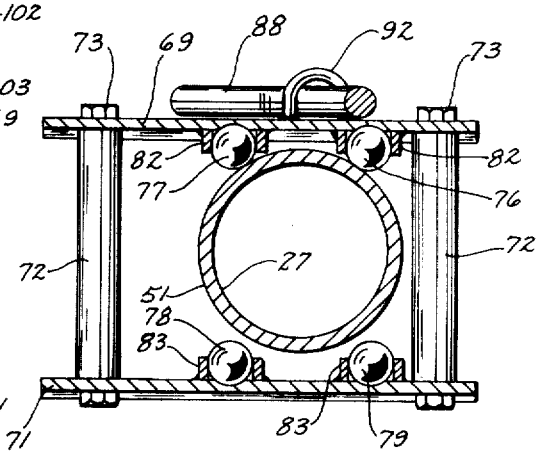
Figure 10:
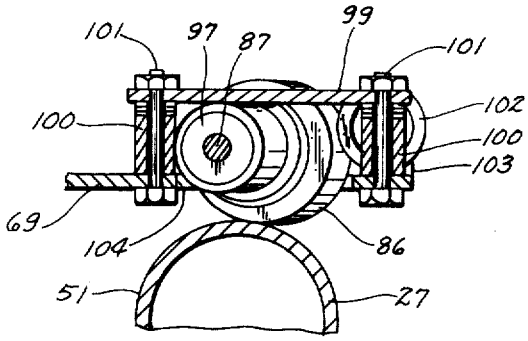
FIG. 10 is a partial sectional view as taken along the line 10—10 in FIG. 5.

The frame top 69 and bottom 71 are mounted in parallel and spaced relation above and below the shaft 27 by means of spacers 72 and capscrews 73 therefor, and with the interconnected top and bottom pieces 69 and 71 of the frame being movable longitudinally and circularly of the shaft 27 by means of antifriction balls 74, 75, 76, and 77 secured to the undersurface of the top piece 69 within a plurality of seats 82, and also by a plurality of balls 78, 79, 80, and 81 which are mounted on the upper surface of the bottom piece 71, again by a plurality of seats 83, as best illustrated in FIG. 9.

Figure 8:
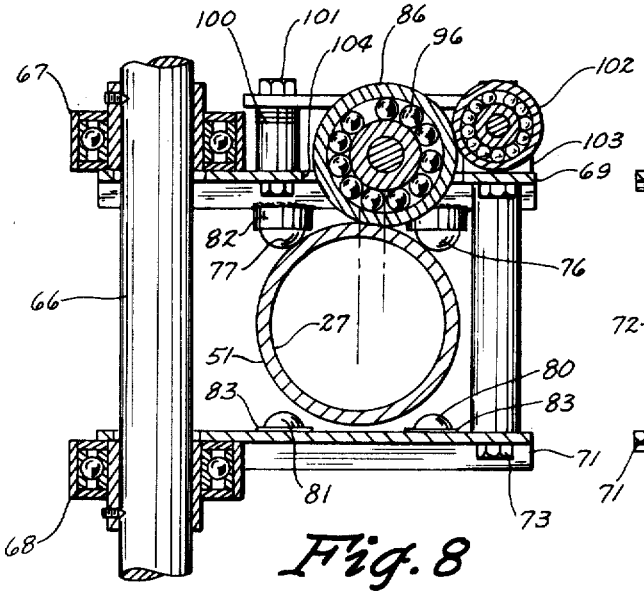
FIGS. 8 and 9 are vertical sectional views as taken along the lines 8—8 and 9—9 in FIG. 5.

The longitudinal and lateral spacing of the upper balls 74–77 inclusive and the lower balls 78–81 inclusive are identical as related to the top and bottom pieces 69 and 71 of the frame 57, and the transverse relationship between the two sets of balls in such that the balls are diametrically opposed as best illustrated in FIGS. 8 and 9. The diametrical spacing is such that whereas, for example, the top two balls are engaged with the shaft surface 51, the lower two are slightly spaced therefrom. Provision can be made for biasing all eight balls into contact with the shaft surface 51, but as presently constructed, usually the top two balls of one set and the lower two balls of another set are in contact with the shaft 27, which ones depending on the direction of movement of the frame unit.

Figure 6:
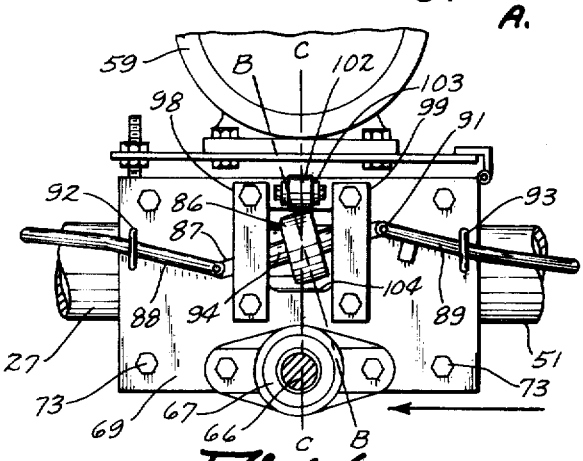
FIG. 6 is a reduced view similar to FIG. 5, and wherein a friction unit is shown in a position opposite that of FIG. 5.
Figure 7:
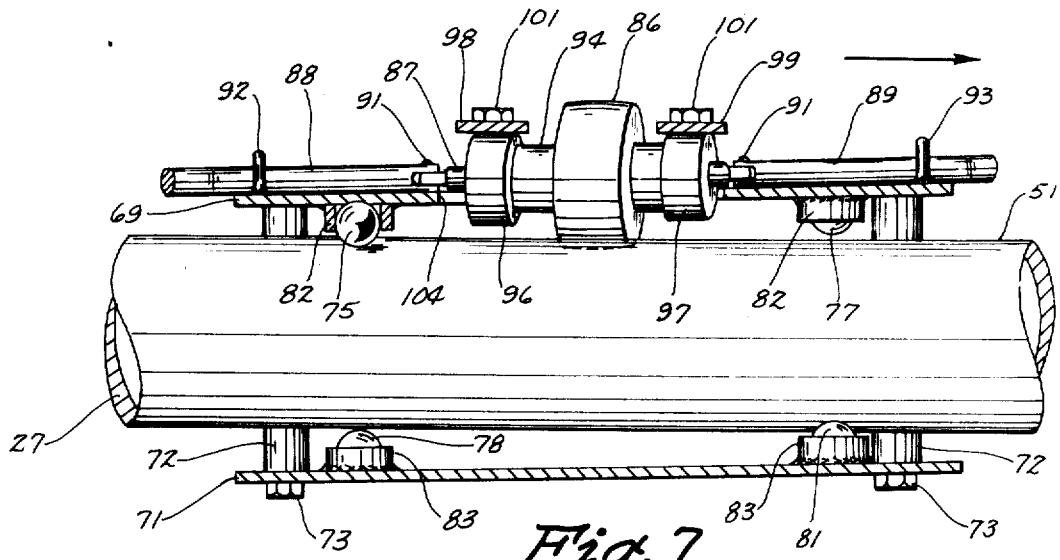
FIG. 7 is a side elevational view as taken along the line 7—7 in FIG. 5.

The friction unit 58 includes a main bearing roller 86 mounted on a middle, straight rod 87 for rotation about an axis parallel to the axis of rotation of the shaft 27, as viewed in side elevation in FIG. 7, for example. The main roller 86 engages the upper surface of the shaft 27 (FIG. 8) due to the weight of the frame unit 34. The rod 87 has pivotally connected to its outer ends an outer rod 88 and an inner rod 89, as by a pair of pins 91, which rods are substantially identical to each other, being straight in one plane as viewed in FIG. 7, and slightly bent in another plane as viewed in FIGS. 5 and 6.

The outer rod 88 and the inner rod 89 are loosely passed through a pair of loops 92 and 93 (FIG. 4) secured to the top piece 69 of the frame 57, such that the three rods 87–89 are capable of being in substantially straight alignment, or of assuming a first position wherein the main roller 86 is rotatable in a first plane (A—A, FIG. 5) angularly related to the plane (C—C, FIG. 6) of rotation of the shaft 27, and of assuming a second position wherein the main roller 86 is rotatable in a second plane (B—B, FIG. 6) also angularly related to the plane C—C, with the planes A—A and B—B being on opposite sides of the shaft transverse planes C—C.

Figure 5:
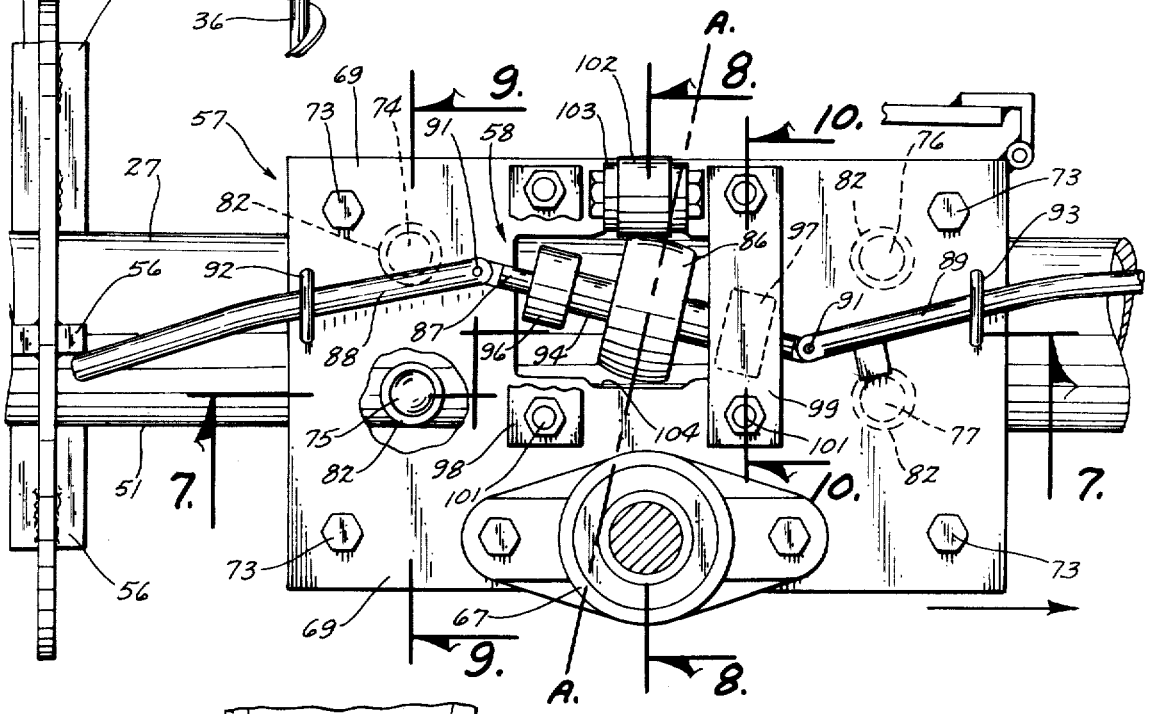
FIG. 5 is an enlarged plan view as taken along the line 5—5 of FIG. 4.

A bearing shaft 94 (FIGS. 5 and 8) mounts the roller 86 on the rod 87, acting as an inner race, and also acts as a mounting for a pair of smaller ball bearings or rollers 96 and 97, and which rollers transfer the weight of the frame unit 34 to the main roller 86 by means of a pair of flat bars 98 and 99 (FIGS. 5, 7, and 8). The bars 98 and 99 are secured as by capscrews 101 to the top piece 69, with each bar directly over a roller 96 and 97 (FIGS. 5 and 7). Spacers 100 separate the bars 98 and 99 from the top piece 69.

Another ball bearing or roller 102 (FIGS. 5 and 8) is provided for lending lateral support to the main roller 86, which roller 102 is mounted directly to the top of the top piece 69 by a mounting block 103 so that its rolling surface is in constant engagement with the rolling surface of the main roller 86 (see FIG. 5). The support roller 102 rotates in a plane parallel with the plane C—C of rotation of the shaft 27. It will be noted that a cutout 104 is formed in the top piece 69 so that swivel movement of the middle rod 87, the main roller 86, and the side rollers 96 and 97 is not impeded, and so of course that the main roller 86 is constantly in contact with the shaft 27.

In operation, assume that both frame units 34 and 34' are located on the shaft 27 in their full line position of FIG. 2, and with the friction drive unit 58 of each frame unit positioned as illustrated in FIG. 6. Power is supplied simultaneously to the shaft drive motor 28 to rotate the shaft 27 in one direction, counterclockwise for example, as viewed from the inner end of the shaft 27 toward the outer. Due to the angular relationship of the direction of rotational movement of the main roller 86 to the direction of rotation of the shaft 27, the frictional relationship therebetween causes movement of the respective frame unit 34 and 34' longitudinally of the shaft 27 and toward the outer end thereof, or toward the bin wall 12. It will be appreciated that also as the wheel 31 at the outer end of the shaft 27 is rotating on the track 32, this frictional relationship will cause the shaft 27 to move horizontally about the bin and over the grain 23 therein.

Each frame unit 34 and 34' moves, therefore, longitudinally outwardly of the shaft 27 in response to rotation of the shaft, until a frame unit engages a plate. As best illustrated in FIGS. 4 and 5, the counterclockwise rotation of the plate 53 will cause one of the beads 56 to engage the free end of the outer rod 88, whereupon, due to the articulated arrangement of the rods 87–89, they will be moved from the first position of FIG. 6 to the second position of FIG. 5, it being seen that the axial direction of the middle rod 87 is thus reversed as compared to the longitudinal axis of the shaft 27. Continued rotation of the shaft 27, still in the same direction of rotation, i.e., counterclockwise, will then result in the frame unit 34 being moved longitudinally inwardly on the shaft 27, again due to the frictional relationship between the shaft 27 and the main roller 86.

Upon return from the dotted line position of FIG. 2 to the full line position thereof, a bead 56 of the plate 54 (FIG. 4) would strike the free end of the inner rod 89, whereupon the rods would be returned from the FIG. 5 position to the FIG. 6 position. Again, continued rotation of the shaft 27 in the same direction would result in the frame unit 24 being moved longitudinally outwardly on the shaft 27.

It may be realized that the relatively positioning of all elements of a frame unit 34 and 34', and the augers 36 and 36' therewith is such that in normal usage the top and bottom pieces 69 and 71 of a frame unit are horizontally disposed, as best shown in FIG. 8. Each frame unit, however, as can readily be seen, has the capability of rotating circularly about the shaft 27 in order to adjust to the drag or resistance of the grain to the movement of the shaft 27.

Although not depicted herein, it is readily envisioned that this arrangement may be used in a right-angular enclosure. Thus, both ends of the shaft 27 would be mounted by a pair of wheels 31 on a pair of parallel tracks 32, and with the operation of the motor 28 resulting in simultaneous rotation of the shaft 27 about its axis, and movement back and forth on the tracks 32. Other than the motor 28 being reversible, and a reversing switch being provided at each end of the tracks similar to the reversing arrangement of U.S. Pat. No. 3,448,966, all other structure would be the same for enabling use of the apparatus 10 in an enclosure, the walls of which are right-angularly related.

I claim:

1. A grain-moving apparatus for operation within an enclosure, the apparatus comprising:

means including vertically disposed, movable element *for moving grain*;

conveyor means supporting said element means, said conveyor means rotatable about its own axis in one direction of rotation to move said element means back and forth on said conveyor means;

means connected to the enclosure for supporting said conveyor means; and power means for rotating said conveyor means.

2. A grain-moving apparatus as defined in claim 1, and further wherein said conveyor means includes a horizontally disposed member having a circular cross section substantially its entire length.

3. A grain-moving apparatus as defined in claim 2, and further wherein said member has a smooth outer surface of a constant diameter substantially its entire length.

4. A grain-moving apparatus as defined in claim 1, and further wherein said element means includes a frame unit mounted on said conveyor means and upon which said element is movably mounted, and includes [further] friction means engaged with said conveyor means and responsive to rotation of said conveyor means in one direction of rotation to move said frame unit alternately in opposite directions [of rotation].

5. A grain-moving apparatus as defined in claim 4, and further wherein a pair of plates are secured to said conveyor means on opposite sides of said frame unit, and which plates are alternately engageable by said friction means, said friction means movable upon engagement with one plate to a first position wherein said frame unit is moved in one direction axially of said conveyor means, and said friction means movable upon engagement with the other plate to a second position wherein said frame unit is moved in an opposite direction axially of said conveyor means.

6. A grain-moving apparatus as defined in claim 5, and further wherein said friction means includes a circular member in frictional engagement with said conveyor means and mounted for rotation about an axis *which lies in a plane* parallel to the axis of rotation of said conveyor means, said circular member in said first position of said friction means *being* rotatable in a first plane angularly related to the plane of rotation of said conveyor and in said second position of said friction means *being* rotatable in a second plane angularly related to the plane of rotation of said conveyor, said first and second planes *being* on opposite sides of said conveyor plane.

7. A grain-moving apparatus as defined in claim 5, and further wherein said friction means includes a trio of articulated rod members the outer two of which are pivotally connected at one end each to an end of the middle rod member such that all three rod members are connected in a line, said middle rod having a roller rotatably mounted thereon which is rotatable about said middle rod as an axis, said frame unit having a pair of loop elements secured thereto in spaced relation and aligned with the axis of said conveyor means, each loop element loosely receiving an outer rod member and whereby each rod member is movable in a plane parallel to the axis of rotation of said conveyor means, the outer end of each outer rod member *being* engageable with one of said plates, rotation of a plate with said conveyor means *being* capable of changing the relative positions of said rod members to each other and to said conveyor means, said middle rod member having opposite angular relationships to the longitudinal axis of said conveyor means in said first and second positions of said friction means.

*8. A grain-moving apparatus as in claim 1 wherein said conveyor means comprises an elongated cylindrical member having a smooth outer surface and said first mentioned means includes means for supporting said element on said member in a manner permitting rotation of said member relative to said support means and permitting movement of said support means and said element longitudinally of said member, said support means including roller means frictionally engageable with said outer surface in planes of rotation which are angularly displaced in opposite directions from the plane of rotation of said member, and means for effecting engagement of said roller means with said surface in such opposite angularly displaced planes of rotation selectively for movement of said support means and said element back and forth longitudinally of said conveyor member as said conveyor member is rotated in said one direction.*

*9. A grain-moving apparatus as in claim 8 wherein said support means includes a roller member frictionally engaging said outer surface, said roller member being adjustable between a first position in which its plane of rotation is angularly displaced in one direction from the plane of rotation of said member and a second position in which its plane of rotation is angularly displaced in an opposite direction from the plane of rotation of said member, and means for adjusting said roller member between said first and second positions.*

*10. Apparatus for moving grain or similar material within an enclosure, comprising an elongated conveyor member for spanning a portion of said enclosure and having a smooth cylindrical outer surface, means for rotating said member about the longitudinal axis of said member, a stirring element, means for supporting said element on said member in a manner permitting rotation of said member relative to said support means and per-*

*mitting movement of said support means and said element longitudinally of said member, and said support means including roller means frictionally engageable with said outer surface in planes of rotation which are angularly displaced in opposite directions from the plane of rotation of said member, and means for effecting engagement of said roller means with said surface in such opposite angularly displaced planes of rotation selectively for movement of said support means and said element back and forth longitudinally of said conveyor member as said conveyor member is rotated in said one direction.*

*11. A grain-moving apparatus as in claim 10 wherein said support means includes a roller member frictionally engaging said outer surface, said roller member being adjustable between a first position in which its plane of rotation is angularly displaced in one direction from the plane of rotation of said member and a second position in which its plane of rotation is angularly displaced in an opposite direction from the plane of rotation of said member, and means for adjusting said roller member between said first and second positions.*

*12. Apparatus as in claim 10 wherein said conveyor member extends generally horizontally in said enclosure.*

*13. Apparatus as in claim 10 for stirring grain in a circular bin, including means for supporting said conveyor member in a generally horizontal position in the upper portion of such a bin with said conveyor extending radially of said bin, and means for rotating said conveyor member about the center of said bin.*

*14. Apparatus as in claim 10 for stirring grain in a right-angular enclosure including means for supporting said conveyor member in said enclosure, and means for moving said conveyor member back and forth in said enclosure.*

*15. Apparatus as in claim 10 wherein said support means includes a frame unit journalled on said cylindrical member, and said roller means comprises a roller member journalled on said frame unit.*

*16. Apparatus as in claim 10 wherein said support means includes a pair of frame members disposed with one above and one below said cylindrical member, and bearing elements on each of said frame members positioned to engage longitudinally spaced portions of said cylindrical member.*

References Cited

The following references, cited by the Examiner, are of record in the patented file of this patent or the original patent.

UNITED STATES PATENTS

| | | | |
|---|---|---|---|
| 2,204,638 | 6/1940 | Weathers | 74—25 |
| 3,251,582 | 5/1966 | Murphy | 259—111 |
| 3,272,480 | 9/1966 | Sukup | 259—111 |
| 3,410,537 | 11/1968 | Feinhold | 259—111 |
| 3,445,091 | 5/1969 | Jackson | 259—102 X |
| 3,448,966 | 6/1969 | Sukup | 259—111 |

HARVEY C. HORNSBY, Primary Examiner

A. I. CANTOR, Assistant Examiner

U.S. Cl. X.R.

259—111